United States Patent [19]

Hendrickson

[11] Patent Number: 4,966,395
[45] Date of Patent: Oct. 30, 1990

[54] RIGID OR FLEXIBLE COUPLING FOR PIPES

[75] Inventor: Thomas R. Hendrickson, Elo, Mich.
[73] Assignee: Quikcoup, Incorporated, Southfield, Mich.
[21] Appl. No.: 392,662
[22] Filed: Aug. 11, 1989
[51] Int. Cl.$^5$ .............................................. F16L 17/04
[52] U.S. Cl. ...................................... 285/12; 285/112; 285/178
[58] Field of Search ............... 285/178, 112, 373, 414, 285/367, 410, 420, 12; 24/279

[56] References Cited

U.S. PATENT DOCUMENTS

| | | | |
|---|---|---|---|
| 3,482,857 | 12/1969 | Gohs | 285/178 |
| 3,493,249 | 2/1970 | Conrad et al. | 285/178 X |
| 4,601,495 | 7/1986 | Webb | 285/112 |
| 4,639,020 | 1/1967 | Rung et al. | 285/367 |

Primary Examiner—Dave W. Arola
Attorney, Agent, or Firm—Harness, Dickey & Pierce

[57] ABSTRACT

A coupling for either rigidly or flexibly connecting the adjacent ends of a pair of aligned pipes, is formed of a circular casing made of a pair of aligned, semi-circular segments which surround a resilient pipe gasket. The opposite ends of the segments have radially outwardly extending lugs which form pairs of overlapping fastening lugs. The lugs of at least one pair each have transversely aligned bolt holes and opposed sockets that are generally concentric with the bolt holes and open towards each other. A bolt extending through the sockets and bolt holes fasten the lugs together and cause the segments to clamp radially inwardly towards the pipes for coupling the pipes together with some permissible flexibility of relative movement. A plug having opposite end portions and a central bolt hole is removably fitted within the opposed lug sockets, with the bolt extending through its central bolt hole. The plug end portions are offset from each other in an axial direction, relative to the axis of the coupling, so that tightening a nut on the bolt wedges the overlapped pair of lugs apart in an axial direction for causing the segments to clamp axially and radially against the pipes and rigidly hold them against relative movement.

12 Claims, 1 Drawing Sheet

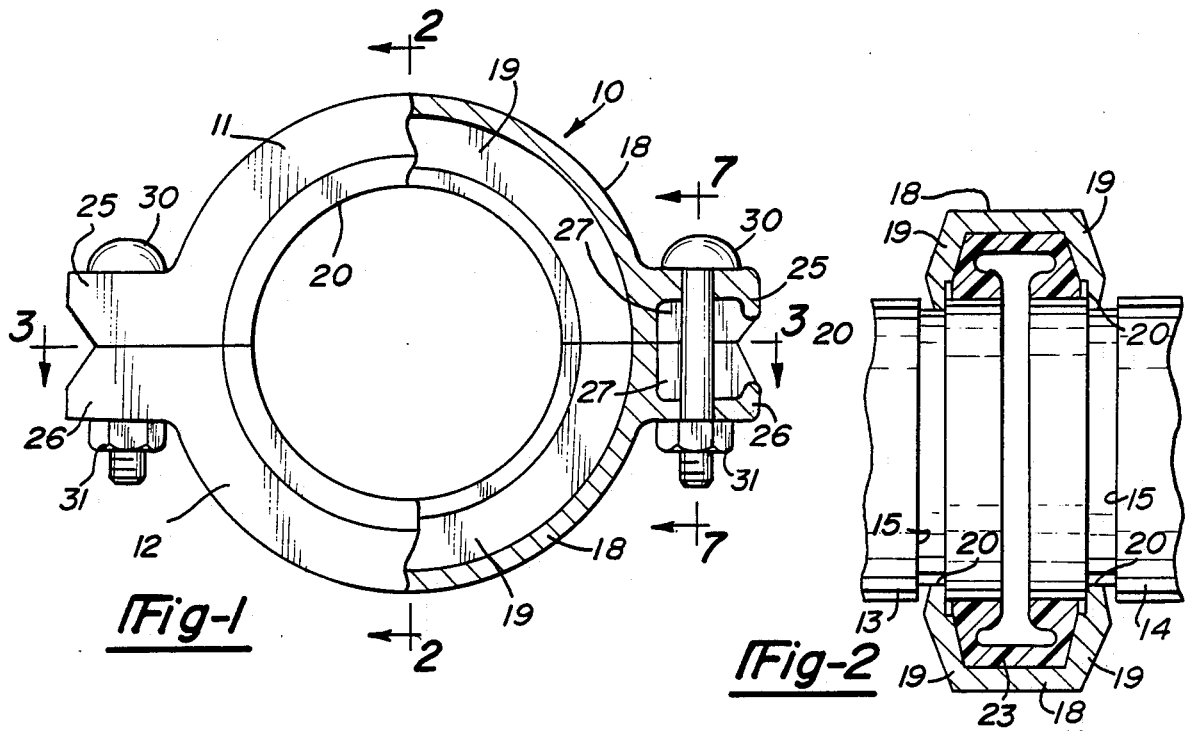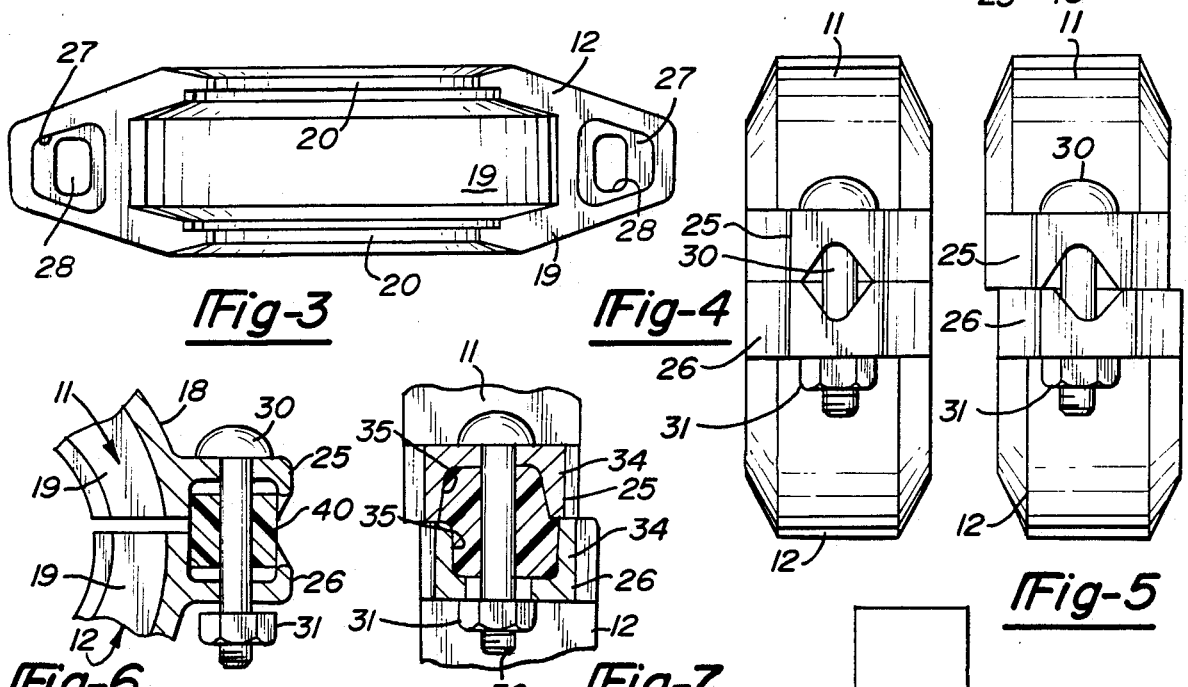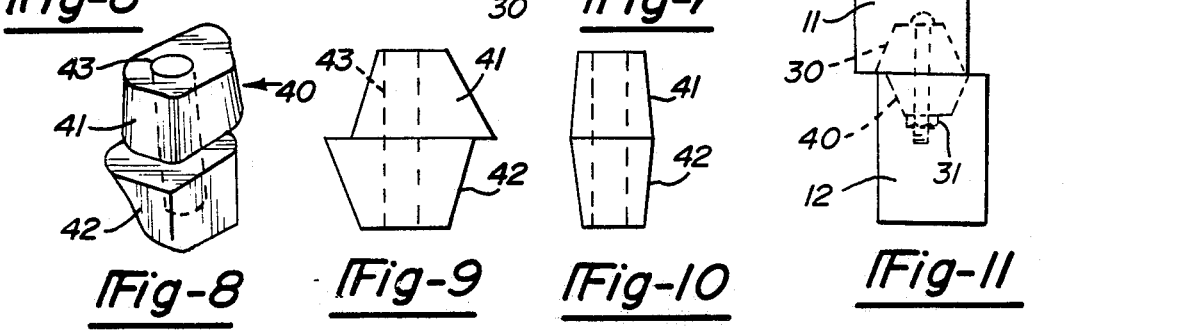

RIGID OR FLEXIBLE COUPLING FOR PIPES

BACKGROUND OF INVENTION

This invention relates to a coupling for connecting pipes provided with exterior connection grooves. More particularly, the invention is concerned with a means, in the form of a plug-like removable insert, for converting a coupling which normally flexibly connects the pipe ends together and permits limited movement of the connected pipes, into a rigid, nonmovable connection.

Conventional couplings used to connect the ends of pipes having exterior connection grooves generally are formed of a circular casing made of two semi-circular segments which are connected together to encircle the pipes. Typically, the segments, are U-shaped in cross-section, with their legs extending radially inwardly. Thus, the free ends of the legs form keys or tenons which extend within grooves formed in the exterior surfaces of the pipes.

Usually, a rubber-like gasket is arranged around the adjacent pipe ends and the two segments are positioned around the gasket, with their keys or tenons, that is, the free ends of their legs, enclosing the gasket. At that point, the segments are connected together to encircle the joint.

Such couplings are somewhat flexible, in that they provide some permissible relative movement between the pipe ends and between the pipes and the coupling because the keys or free edges of the legs of the segments are usually narrower than the grooves in the pipes. That is, there is some permissible movement between the keys and the pipe grooves. This is particularly useful in plumbing systems where pipes may be somewhat misaligned during installation or may become misaligned or may expand or contract due to ambient conditions or to the temperature of the fluid flowing through the pipes.

However, in some installations it is necessary to have a rigid coupling where the pipe ends are held against relative movement with respect to each other or with respect to the coupling. In such cases, a typical coupling of the type described above is not adequate to hold the pipes against relative movement. Hence, different couplings are used to produce a rigid connection. One example of this type of rigid coupling construction is disclosed in U.S. Pat. No. 4,639,020 issued Jan. 27, 1967. In that patent, the coupling segments are provided with overlapping side lugs through which bolts are extended, for bolting the segments together. The adjacent surfaces of the two segments, at the bolt lugs, are angled in two directions, that is, in an axial and in a radial direction. Thus, as the bolts are tightened, the two segments are offset relative to each other to lock into the pipes. This is illustrated, particularly, in FIG. 10 of the above U.S. Pat. No. 4,659,020.

Where it is necessary to use couplings which provide a rigid connection between the adjacent pipe ends, it is necessary to inventory and to have such couplings available on a job site along with the usual couplings which provide the flexible connections. Thus, it is necessary to manufacture a separate line of couplings in assorted sizes, which produce rigid connections for use as necessary.

In order to obviate this need for additional couplings, it is desirable to have couplings which function to produce either a flexible coupling connection or, alternatively, a rigid connection, as desired. This invention is concerned with providing a means for selectively converting a standard, flexible type coupling, into a rigid coupling by means of a special connector insert part.

SUMMARY OF INVENTION

The invention herein contemplates converting a conventional flexible-type coupling, used for connecting pipes having grooves at their opposite ends, into rigid type couplings. Thus, the coupling includes a circular casing made of two semi-circular segments which are connected together by bolts, or the like, extending through overlapping, radially outwardly extending lugs formed on each of the opposite ends of the segments.

The pairs of overlapping or aligned lugs are provided with aligned bolt holes through which the fastening bolts are extended. However, they are also formed with enlarged sockets at the bolt holes, with the sockets opening towards each other. Those sockets are commonly formed in coupling segments for purposes of reducing the metal wall thicknesses at the fastening lugs. Hence, those sockets generally consist of enlarged, open or relieved areas aligned with the bolt holes at the adjacent lug faces.

The segments and, therefore, the casing, are U-shaped in cross-section with the legs of the U extending radially inwardly. The free ends of the legs may be narrowed and form keys or tenons which fit into the grooves that encircle the end portions of the pipes to be coupled. In addition, an annular rubber-like gasket is utilized to encircle the ends of the two pipes for sealing the joint. The gasket is arranged within the channel formed by the casing. Because of the loose fitting of the tenons in the grooves and the resilient gasket, there is a relative looseness of the parts which permits the pipes to flex or move slightly relative to each other and to the coupling while maintaining the seal resulting from the gasket.

The invention contemplates rigidifying the joint formed by the above construction by inserting a plug or insert within at least one pair of the aligned lugs for axially offsetting the two segments so as to cause the tenons to clamp against the walls of the grooves in an axial, as well as in a radial direction. The plug is formed with two integral end portions and a central bolt receiving hole. The end portions are shaped to fit within the opposite sockets in the lugs. The hole through the plug is arranged to closely receive the fastening bolt that extends through the lugs.

The two end portions of the plug are offset, in a generally axial direction, relative to each other so that when they are deeply inserted within the sockets, they cause the socketed lugs to be axially offset. Preferably, the plugs are tapered towards their free ends so that they act as wedges. That is, their sloping surfaces wedge against corresponding sloping surfaces defining the sockets for wedging the segments axially apart as the bolt and its fastening nut are tightened into place.

One object of this invention is to provide a simplified means, in the form of a simple, inexpensive plastic, molded plug which may be utilized, whenever a rigid coupling is desired, by merely inserting it into the adjacent lugs of a conventional flexible type coupling. Thus, a plumbing contractor may stock a number of such plugs, which require little space and very little expense, and select and use the appropriate sizes as needed. Therefore, the need to inventory or to carry assorted sizes of rigid types of couplings is eliminated.

Another object of this invention is to permit conventional flexible type couplings to be immediately converted into rigid type couplings, when needed, without any substantial increase in expense or labor.

Still a further object of this invention is to permit a conventional coupling to be optionally used either as a flexible or a rigid coupling, depending upon the requirements of a particular job.

These and other objects and advantages of this invention will become apparent upon reading the following specification, of which the attached drawings form a part.

DESCRIPTION OF DRAWINGS

FIG. 1 is an elevational view, partially in cross-section, of the coupling casing with the two segments bolted together.

FIG. 2 is a cross-sectional view, taken as if in the direction of arrows 2—2 of FIG. 1, but also showing the annular gasket and the two connected pipe ends.

FIG. 3 is a plan view taken in the direction of arrows 3—3 of FIG. 1 and showing one of the segments.

FIG. 4 is a side view of the assembled coupling.

FIG. 5 is a side view, similar to FIG. 4, but showing the two coupling segments offset relative to each other.

FIG. 6 is a cross-sectional, fragmentary view of the aligned segment lugs, with the plug in position, and with the bolt in position and the nut ready to be tightened.

FIG. 7 is a cross-sectional, end view of the lugs with the plug in place and the lugs offset, and is taken as if in the direction of arrows 7—7 of FIG. 1.

FIG. 8 is a perspective view of the plug per se.

FIG. 9 is an elevational view of the plug showing the offset upper and lower plug portions.

FIG. 10 is a side elevational view of the plug.

FIG. 11 is a schematic view showing the segments axially offset as a result of the placement of the plug.

DETAILED DESCRIPTION

As illustrated in FIG. 1, the coupling is formed of a circular casing 10 made of two semi-circular segments 11 and 12. The coupling segments are arranged, when connected together, to encircle the adjacent ends of a pair of pipes 13 and 14 which are to be connected. These pipes have conventional grooves 15 formed near their ends for fastening purposes.

The segments, and the casing, are U-shaped in cross-section to form an outer base 18 and radially inwardly extending legs 19. The inner or free ends of the legs are narrowed to form keys or tenons 20 which fit within the respective pipe grooves 15, as illustrated in FIG. 2.

A conventional, U-shaped in cross-section, rubber-like gasket 23 is arranged around the ends of the pipe and is contained within the U-shaped cross-section casing. The gasket seals the gap between the ends of the pipes to prevent fluid leakage.

The casing segments are fastened together by means of bolts extending through aligned lugs that are formed on the opposite ends of the segments. Thus, lugs 25 are integrally formed on the opposite ends of the segment 11 and similar lugs are integrally formed on the opposite ends of segment 12. The two segments, and their lugs, are mirror images of each other.

The lugs are hollow and, therefore, provide sockets 27 which extend outwardly towards each other for each pair of aligned lugs. In addition, the lugs have aligned bolt holes 28 for receiving fastening bolts 30 which are secured in place by means of nuts 31. The bolt holes are preferably elongated in the axial direction, that is, in the direction of the axis of the coupling, as illustrated in FIG. 3.

As illustrated in cross-section in FIG. 7, the lug sockets 27 are approximately U-shaped in cross-section with side legs 34. The inner surfaces or walls 35 of these legs are tapered or sloped.

The plug 40, which is illustrated in FIGS. 8-10, is formed of a molded plastic material, such as nylon or the like. It is formed in two integral parts, namely, an upper part 41 and a lower part 42. As can be seen, the upper and lower parts are tapered and shaped to fit into the lugs sockets between the sloped wall hollow legs. The plug is provided with a central bolt hole 43 which is of a size to closely fit the fastening bolts 30.

In operation, when it is desired to use the coupling for normal or usual flexible pipe connections, the coupling is utilized without the plug and is mounted around the pipe ends as illustrated in FIG. 2. In that instance, the keys or tenons 20 of the legs 19 of the U-shaped segments fit into the pipe grooves 15 for holding the pipes in position.

If it is desired to use the coupling for a rigid connection, the plug is utilized. In this case, the lug bolts are removed from the lugs and the plugs are inserted into the hollow sockets of the lugs. This is illustrated in FIG. 6. Then, the bolts are inserted through the lug bolt holes 28 and through the plug bolt hole 43. Next, the nuts are tightened.

When the nuts are tightened, the plug begins to tightly seat within the sockets and the sloping plug walls wedge against the sloping lug interior walls to shift the segments relative to each other. As illustrated in FIG. 5, the insertion of the plugs causes the upper segment 11 to shift in an axial direction relative to the lower segment 12. That same action is shown schematically in FIG. 11 which illustrates the sidewise movement of the upper segment relative to the lower segment when the plugs are inserted.

The insertion of the plugs causes the keys or tenons of the segments to either cock at an angle and bite into the groove base or side walls or, alternatively, to press in an axial direction against the walls defining the grooves 15 in the pipes. In either event, an axially directed force, as well as a radially inwardly directed force, is applied to the pipes. This clamps the pipes rigidly within the coupling and precludes the previously available flexible movement of the pipes. Thus, a conventional coupling can be used to produce a rigid connection simply by inserting the plugs as indicated.

A plug may be placed in each of the two aligned pairs of lugs. Alternatively, a plug may be placed in only one of the aligned pairs of lugs and the opposite pair may be simply bolted together as usual. In that case, the upper and lower segments are cocked at an angle relative to each other to produce the rigid coupling.

Although the coupling illustrated comprises symmetrically located pairs of lugs, a coupling having only one pair of lugs and a hinge on its opposite side may be utilized as well, depending upon the required strength requirements and the sizes of the pipes involved. Thus, the invention contemplates utilizing only one pair of lugs and one plug or two pairs of lugs and plugs, depending upon the requirements for the coupling.

This invention may be further developed within the scope of the following claims. Accordingly, it is desired that the foregoing description be read as being merely illustrative of an operative embodiment of this invention and not in a strictly limiting sense.

Having fully described an operative embodiment of this invention, I now claim:

1. A pipe coupling for either rigidly or flexibly connecting the adjacent ends of a pair of aligned pipes with abutment means thereon, comprising:

a circular casting for encircling adjacent pipe ends and formed of a pair of generally coplanar, aligned, semicircular segments;

radially outwardly extending projections are formed on the opposite ends of the segments and are aligned with the adjacent projections of the opposite segment;

at least one pair of adjacent projections are provided with aligned bolt receiving holes which are partially enlarged sockets that open towards each other;

a bolt extending through the aligned bolt holes and enlarged sockets and having a nut-like fastener for bolting the projections together for causing the segments to clamp radially inwardly against the aligned pipe ends which the casing encircles for connecting the pipe ends together with some limited degree of relative movement permissible;

a double ended plug having opposite end portions which are each removably positioned within one of the sockets and which is shaped to closely fit within such sockets;

said plug having a generally central bolt hole through which said bolt extends and is closely fitted;

and with the plug end portions being slightly offset relative to each other in a generally axial direction relative to the coupling axis, so that tightening of the nut causes the plug to position the projections apart in a generally axial direction which causes the segments to shift moving apart in a generally axial direction for clamping the segments against the abutment means of said pipes in both axial and radial directions for rigidly coupling the pipe ends together.

2. A pipe coupling as defined in claim 1, and including at least one of the plug end projections having a tapered, wedge-like surface and cooperating with a corresponding surface within its socket for wedging the projections apart as the nut is tightened upon the bolt.

3. A pipe coupling as defined in claim 1, and with the segments being similarly U-shaped in cross-section to form a radially inwardly opening annular channel, having a base and spaced apart legs, with the free ends of the opposite legs of the channel forming radially inwardly directed keys for coupling with said abutment means, said abutment means comprising fastening grooves formed in and encircling the adjacent pipe ends;

whereby when the segments are moved apart in an axial direction at their projections by the plug, the keys engage against walls which define the grooves in the pipe ends.

4. A pipe coupling as defined in claim 3, and including an annular, resilient gasket positioned within the casing for encircling and sealing against the adjacent end portions of the aligned pipes for sealing against the pipes and resiliently flexing for permitting some movement of the pipes relative to each other and to the coupling when the plug is removed from the sockets.

5. A pipe coupling as defined in claim 4, and including the socket in said one projection including a sloping surface which is complimentary to a tapered, wedge-like surface formed on the plug end portion which is fitted in said socket, so that movement of the plug end portion more deeply into the pocket, due to the tightening of the nut, causes said transverse movement.

6. A pipe coupling as defined in claim 5, and including the opposite socket and its plug end portion being complimentarily tapered for transversely moving their segment projections.

7. A pipe coupling as defined in claim 5, and including the opposite pair of adjacent projections being formed similarly to the first mentioned pair with opposing sockets, bolt holes and a plug, with a bolt extending therethrough for moving the opposite pair of projections apart transversely for thereby axially offsetting the two segments relative to each other.

8. A pipe coupling as defined in claim 1, and including at least one of said bolt holes in one of the projections being elongated in an axial direction relative to the coupling so that the bolt may move transversely, that is, in an axial direction, relative to said elongated hole and said one projection may move transversely relative to the bolt when the nut is tightened.

9. A coupling fastening lug plug for a pipe coupling including a pair of semi-circular segments that are aligned, generally coplanar, to form a circular casing for surrounding and connecting together the adjacent ends of a pair of pipes, with means for mechanically fastening the segments together, and said means including a bolt lug formed on one end of each coupling, with the lugs overlapping and having aligned bolt holes therethrough, and with the bolt holes enlarged at the adjacent surfaces of the lugs to form opposed sockets generally concentric with the bolt holes and through which a bolt passes, comprising:

a double ended plug having a pair of opposite end portions each shaped to closely fit into the opposed sockets and with the plug having a generally central bolt hole through which the fastening bolt extends and is closely fitted;

with the plug end portions being offset relative to each other in a direction generally along the axial direction of the coupling;

whereby the lugs and, therefore, the segments are axially offset by the offset plug end portions when the bolt is extended through the plug bolt hole and lug bolt holes and is fastened by a mechanical fastening means.

10. A coupling fastening lug plug, as defined in claim 9, and including the plug end portions each being slightly tapered inwardly towards their free ends for closely fitting within and wedging against complimentary sloping walls defining the lug sockets.

11. A coupling fastening lug plug, as defined in claim 10, and including said plug being molded of a plastic material with the plug end portions being integral.

12. A coupling fastening lug plug, as defined in claim 11, and including the bolt hole extending through the plug being substantially centered in one of the plug end portions, and with the opposite plug end portion being substantially offset relative to the central axis of the bolt hole in the plug.

* * * * *